(12) United States Patent
Suzuki (10) Patent No.: US 12,466,193 B2
(45) Date of Patent: Nov. 11, 2025

(54) PRINTING DEVICE AND METHOD FOR CONTROLLING PRINTING DEVICE

(71) Applicant: SEIKO EPSON CORPORATION, Tokyo (JP)

(72) Inventor: Masato Suzuki, Nagano (JP)

(73) Assignee: Seiko Epson Corporation, Tokyo (JP)

(*) Notice: Subject to any disclaimer, the term of this patent is extended or adjusted under 35 U.S.C. 154(b) by 253 days.

(21) Appl. No.: 18/349,207

(22) Filed: Jul. 10, 2023

(65) Prior Publication Data

US 2024/0017554 A1 Jan. 18, 2024

(30) Foreign Application Priority Data

Jul. 12, 2022 (JP) .................. 2022-111577

(51) Int. Cl.
*B41J 2/21* (2006.01)
*G06K 15/02* (2006.01)
*G06K 15/10* (2006.01)

(52) U.S. Cl.
CPC .......... *B41J 2/2132* (2013.01); *G06K 15/102* (2013.01); *G06K 15/1809* (2013.01); *G06K 15/1894* (2013.01); *G06K 15/1836* (2013.01)

(58) Field of Classification Search
CPC ...... B41J 2/04503; B41J 2/04573; B41J 2/07; B41J 19/202; B41J 19/76; B41J 19/14
See application file for complete search history.

(56) References Cited

U.S. PATENT DOCUMENTS

| 5,748,856 A * | 5/1998 | Cariffe ................. G06K 15/107 358/1.8 |
| 2019/0068821 A1* | 2/2019 | Mutsuo ................. H04N 1/042 |

FOREIGN PATENT DOCUMENTS

JP 2019-038176 A 3/2019

* cited by examiner

*Primary Examiner* — Thinh H Nguyen
(74) *Attorney, Agent, or Firm* — Global IP Counselors, LLP (57) ABSTRACT

A printing device includes a head in which a plurality of nozzles configured to form dots by ejecting liquid onto a medium are arranged in a first direction, a first scanning section that performs a first scan, a second scanning section on which the head is mounted, the second scanning section and the medium moving relatively in a second direction, and a control section that causes the head to form the dots that are longer in the second direction than in the first direction, based on a pixel data group, wherein when printing is executed based on a pixel data group in which the first resolution is smaller than the second resolution, the control section offsets at least a part of the pixel columns from other pixel columns in the first direction by a predetermined distance that is less than an inverse number of the first resolution.

9 Claims, 5 Drawing Sheets

PRINTING DEVICE AND METHOD FOR CONTROLLING PRINTING DEVICE

The present application is based on, and claims priority from JP Application Serial Number 2022-111577, filed Jul. 12, 2022, the disclosure of which is hereby incorporated by reference herein in its entirety.

BACKGROUND

1. Technical Field

The present disclosure relates to a printing device and a method for controlling the printing device.

2. Related Art

In order to suppress the occurrence of so-called banding, which is stripe-shaped gaps between dots in a solid coated portion, it is known in the related art, such as shown in JP-A-2019-38176, a device in which dots are thinned out in a checkerboard pattern and the size of dots that are not thinned out is increased.

In the above-described apparatus, when printing is performed at a higher resolution in the direction in which the medium is transported than in the direction intersecting with the direction in which the medium is transported, the fact that so-called laterally elongated dots are likely to be formed is not taken into consideration, and there is a concern that suppression of the occurrence of a stripe-shaped gaps between dots is limited.

SUMMARY

A printing device includes a head in which a plurality of nozzles configured to form dots by ejecting liquid onto a medium are arranged in a first direction, a first scanning section that performs a first scan in which the head and the medium are relatively moved in the first direction, a second scanning section on which the head is mounted, the second scanning section and the medium moving relatively in a second direction, which intersects the first direction, and a control section that causes the head to form the dots that are longer in the second direction than in the first direction, based on a pixel data group having columns in the second direction, the pixel columns having image data in the first direction, wherein assuming that a resolution in the first direction of the pixel data group is defined as a first resolution and a resolution in the second direction is defined as a second resolution, when printing is executed based on a pixel data group in which the first resolution is smaller than the second resolution, the control section offsets at least a part of the pixel columns from other pixel columns in the first direction by a predetermined distance that is less than an inverse number of the first resolution.

A control method of a printing device, the printing device including a head in which a plurality of nozzles configured to form dots by ejecting liquid onto a medium are arranged in a first direction, a first scanning section that performs a first scan in which the head and the medium are relatively moved in the first direction, and a second scanning section that mounts the head and relatively moves in a second direction intersecting with the first direction with respect to the medium, the control method includes causing the head to form the dots that are longer in the second direction than in the first direction, based on a pixel data group having columns in the second direction, the pixel columns having image data in the first direction, and assuming that a resolution in the first direction of the pixel data group is defined as a first resolution and a resolution in the second direction is defined as a second resolution, when printing is executed based on a pixel data group in which the first resolution is smaller than the second resolution, the control section offsets at least a part of the pixel columns from other pixel columns in the first direction by a predetermined distance that is less than an inverse number of the first resolution.

DESCRIPTION OF EMBODIMENTS

1. First Embodiment 1-1. Configuration of Printing Device

Figure 1:
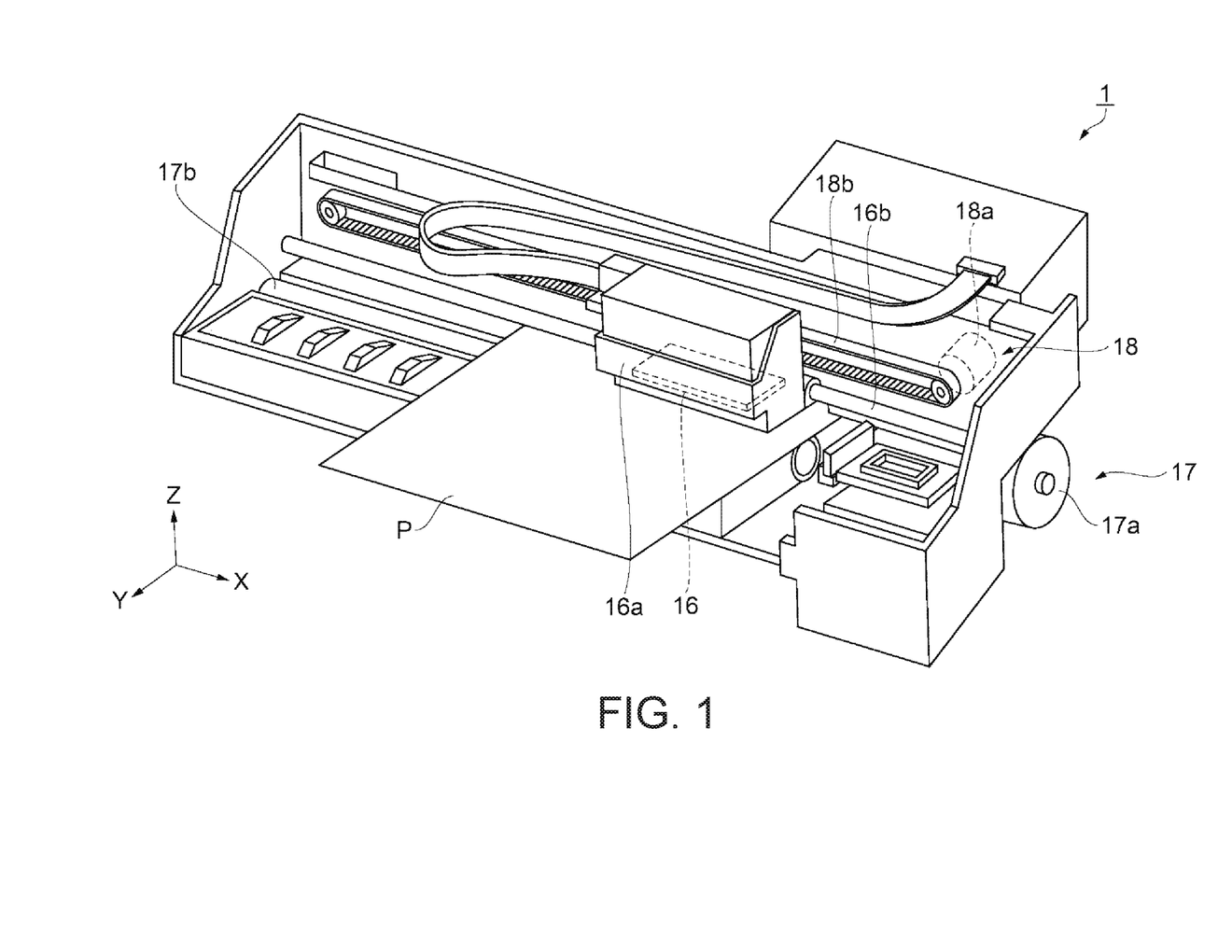
FIG. 1 is a perspective view of a printing device.
Figure 2:
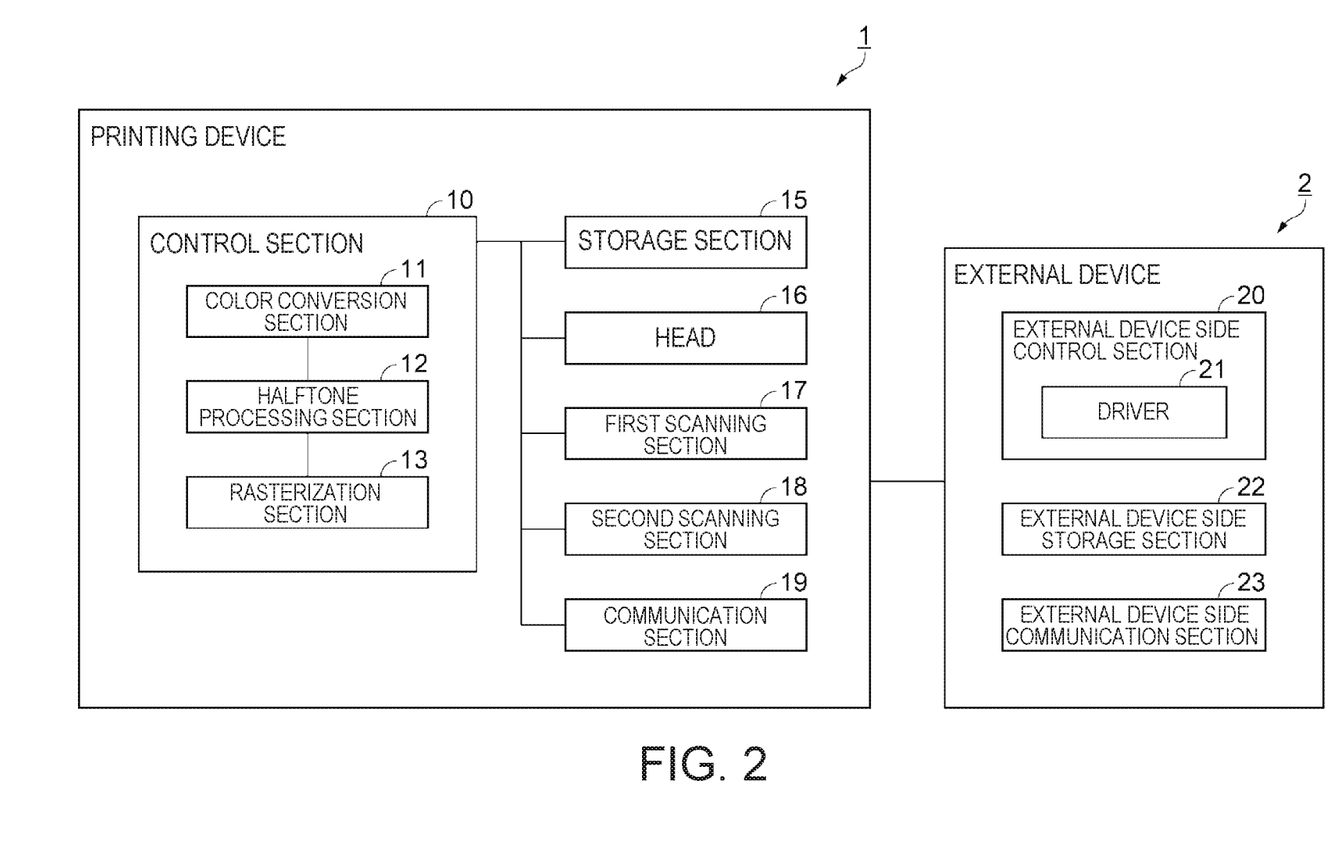
FIG. 2 is a block diagram showing configuration of a printing device.
Figure 3:
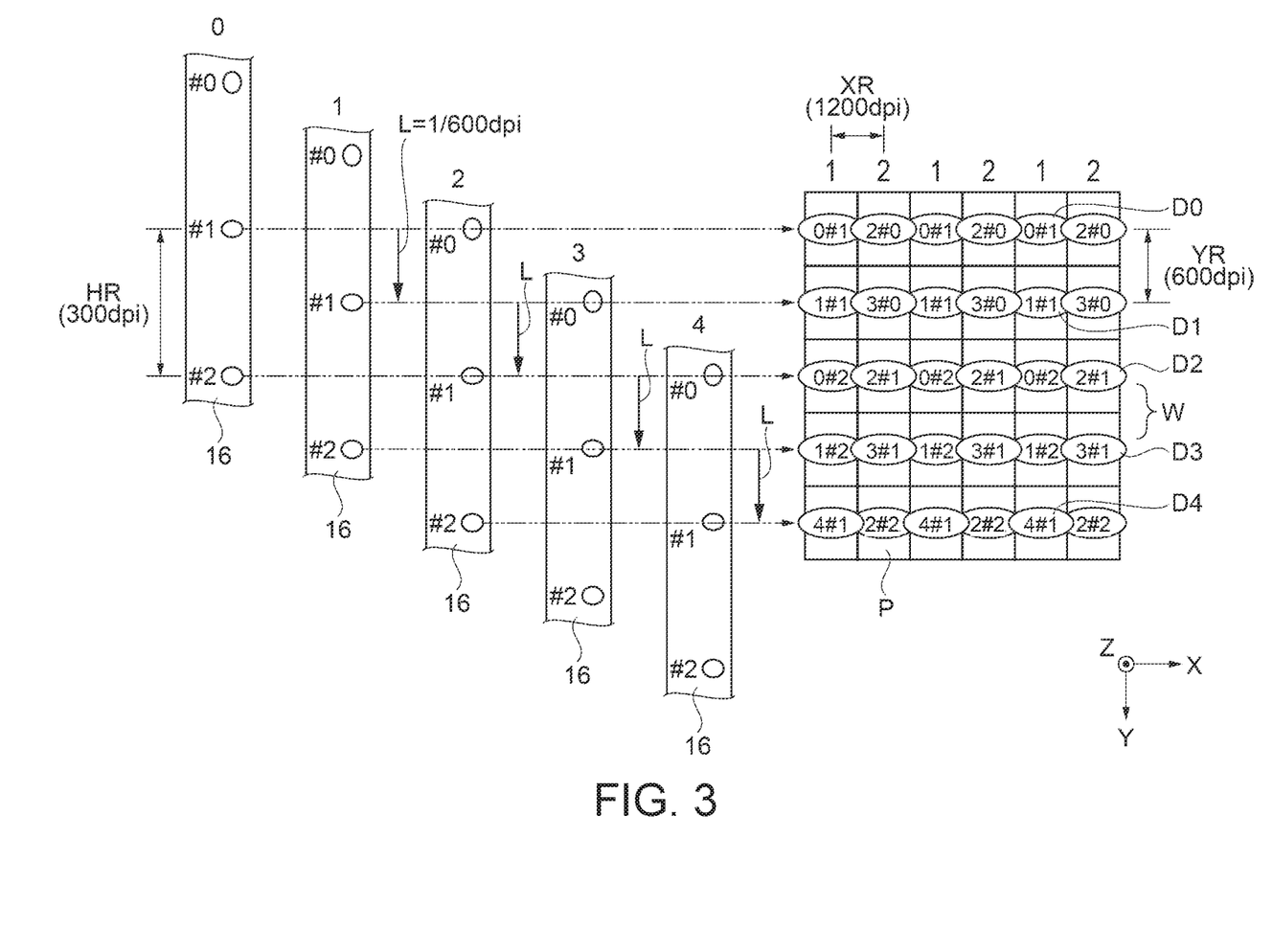
FIG. 3 is a conceptual drawing showing a relationship between nozzles and dots at the time of first rasterization.

The following is a description of a printing device 1 according to an embodiment, with reference to FIGS. 1 and 2, and in part to FIG. 3. Directions in the drawings will be described using a three dimensional coordinate system. For the convenience of description, the positive direction of the Z-axis will be referred to as an upward direction or simply up, and the negative direction will be referred to as a downward direction or simply down, the positive direction of the X-axis will be referred to as a rightward direction or simply right, and the negative direction will be referred to as a leftward direction or simply left, the positive direction of the Y-axis will be referred to as forward or simply to the front, and the negative direction will be referred to as rearward or simply to the rear.

As shown in FIG. 1, the printing device 1 is an inkjet printer that performs printing by ejecting a liquid such as ink onto paper P which is a medium. The paper P may include plain paper, photo paper, synthetic paper, and resin such as film and DVD.

The left-right direction in FIG. 1 corresponds to the main scanning direction which is the second direction, and the front-rear direction corresponds to the sub-scanning direction which is the first direction.

The printing device 1 includes a head 16, a first scanning section 17, and a second scanning section 18.

The head 16 is mounted on a carriage 16a. The second scanning section 18 includes a carriage motor 18a, a belt 18b, the carriage 16a, and a carriage shaft 16b. In the second scanning section 18, the belt 18b is moved by the carriage motor 18a, and the carriage 16a attached to the belt 18b is moved in the left-right direction along the carriage shaft 16b.

The first scanning section 17 includes a transportation motor 17a and a transportation roller 17b. In the first scanning section 17, the transportation roller 17b is rotated by the transportation motor 17a to move the paper P in the front-rear direction. The paper P is moved along a transport path formed between the head 16 and the transportation roller 17b.

The head 16 can form dots by arranging a plurality of nozzles in the first direction and ejecting ink downward toward the paper P while moving together with the carriage 16a. The movement by the first scanning section 17 and the second scanning section 18 is also referred to as scanning, and the former is also referred to as first scanning and the latter is also referred to as second scanning.

In this manner, the first scanning section 17 can relatively move the head 16 and the paper P in the front-rear direction. In addition, in the second scanning section 18, the head 16 is mounted on the carriage 16a, and the head 16 and the paper P can be relatively moved in the left-right direction intersecting the front-rear direction.

After the paper P is moved by the first scanning section 17, the head 16 ejects ink toward the stopped paper P while moving by the second scanning section 18. By repeating this cycle, the printing device 1 prints a predetermined image on the paper P.

Since the head 16 ejects the ink onto the paper P while moving in the left-right direction by the second scanning section 18, as shown in FIG. 3 (to be described later), the ink that lands on the paper P tends to form a dot having a shape that is longer in the left-right direction than in the front-rear direction, and tends to form a so-called laterally elongated dot. In addition, satellite ink droplets ejected from the nozzles of the head 16 also tend to be scattered in the left-right direction of the main droplet and land on the paper P, and are a factor in forming a laterally elongated dot.

The printing device 1 can be mounted with ink cartridges or ink tanks storing ink of each color of, for example, cyan, magenta, yellow, and black (CMYK) as ink colors. Ink cartridges or the like supply the ink of each color to the nozzle array of the corresponding head 16.

As shown in FIG. 2, the printing device 1 includes a control section 10, a storage section 15, and a communication section 19.

The control section 10 includes a Central Processing Unit (CPU) that integrally controls each section of the printing device 1, a Universal Asynchronous Receiver Transmitter (UART) that manages input and output, a Field Programmable Gate Array (FPGA) or a Programmable Logic Device (PLD) that is a logic circuit, and the like. The CPU is also referred to as a processor.

The storage section 15 includes a Flash Read Only Memory (Flash-ROM) which is a rewritable nonvolatile memory, a Random Access Memory (RAM) which is a volatile memory, and the like.

The CPU of the control section 10 reads a program such as firmware stored in the Flash-ROM of the storage section 15, and executes the program using the RAM of the storage section 15 as a work area.

As will be described later, the control section 10 includes a color conversion section 11, a halftone processing section 12, and a rasterization section 13.

The communication section 19 of the printing device 1 includes a communication circuit capable of communicating with an external device 2 by wired communication or wireless communication.

The external device 2 is a computer, a tablet, a smartphone, or the like. As illustrated in FIG. 2, the external device 2 includes an external device side control section 20 including a CPU, an external device side storage section 22 including a RAM, a Flash-ROM that is a non-volatile memory, a Hard Disk Drive (HDD), and the like, an external device side communication section 23 including a communication circuit capable of communicating with the printing device 1, and the like.

The CPU of the external device side control section 20 of the external device 2 reads and executes a program which is an application such as an illustration preparation application, a graphics creation application, and a documentation application stored in the external device side storage section 22. The external device side control section 20 generates image data from an application. The communication section 19 of the printing device 1 receives image data, which is input data, from the external device side communication section 23.

The external device side control section 20 includes a driver 21 capable of generating image data and controlling the printing device 1.

Based on the received image data, the control section 10 generates pixel data for ejecting ink from the nozzles of the head 16. Under the control of the control section 10, based on the pixel data, a drive signal is applied to a drive element provided in the nozzle of the head 16, ink is ejected from the nozzle to the paper P, and dots are formed to print an image.

The control section 10 can change the amount of ink ejected from the nozzle by changing the pattern of the drive signal to be applied. As a result, the head 16 can form dots of different sizes on the paper P. Depending on the characteristics of the nozzle, the control section 10 may change the number of times that the drive signal is applied to the drive element to change the amount of ink to be applied to the paper P and forming dots of different sizes, without changing the pattern of the drive signal to be applied.

Here, with reference to FIG. 3, a configuration of nozzles of the head 16, a movement operation by the first scanning section 17 and the second scanning section 18, and a relationship between dots formed on the paper P will be described.

FIG. 3 schematically shows an example of nozzle rows corresponding to one ink color in the head 16. In the nozzle array of the head 16, a plurality of nozzles is arranged in a nozzle array direction which is forward.

In FIG. 3, the positions of the nozzles in the nozzle row are indicated by using numbers such as nozzle #0 to nozzle #2 in the nozzle arrangement direction. A nozzle pitch HR, which is an interval between nozzles of the nozzle array, is, for example, 300 dot per inch (dpi).

The control section 10 can cause the first scanning section 17 to move the paper P in the front-rear direction by a distance, for example, corresponding to the inverse number of the resolution 1200 dpi.

As a result, the control section 10 can set the first resolution YR, which is the resolution in the front-rear direction by the first scanning section 17, in units of 1200 dpi. In the example of FIG. 3, the control section 10 can set the first resolution YR to 600 dpi. The control section 10 can cause the first scanning section 17 to move the paper P rearward by the first transporting amount L, which is the inverse number of 600 dpi that is the resolution.

Figure 5:
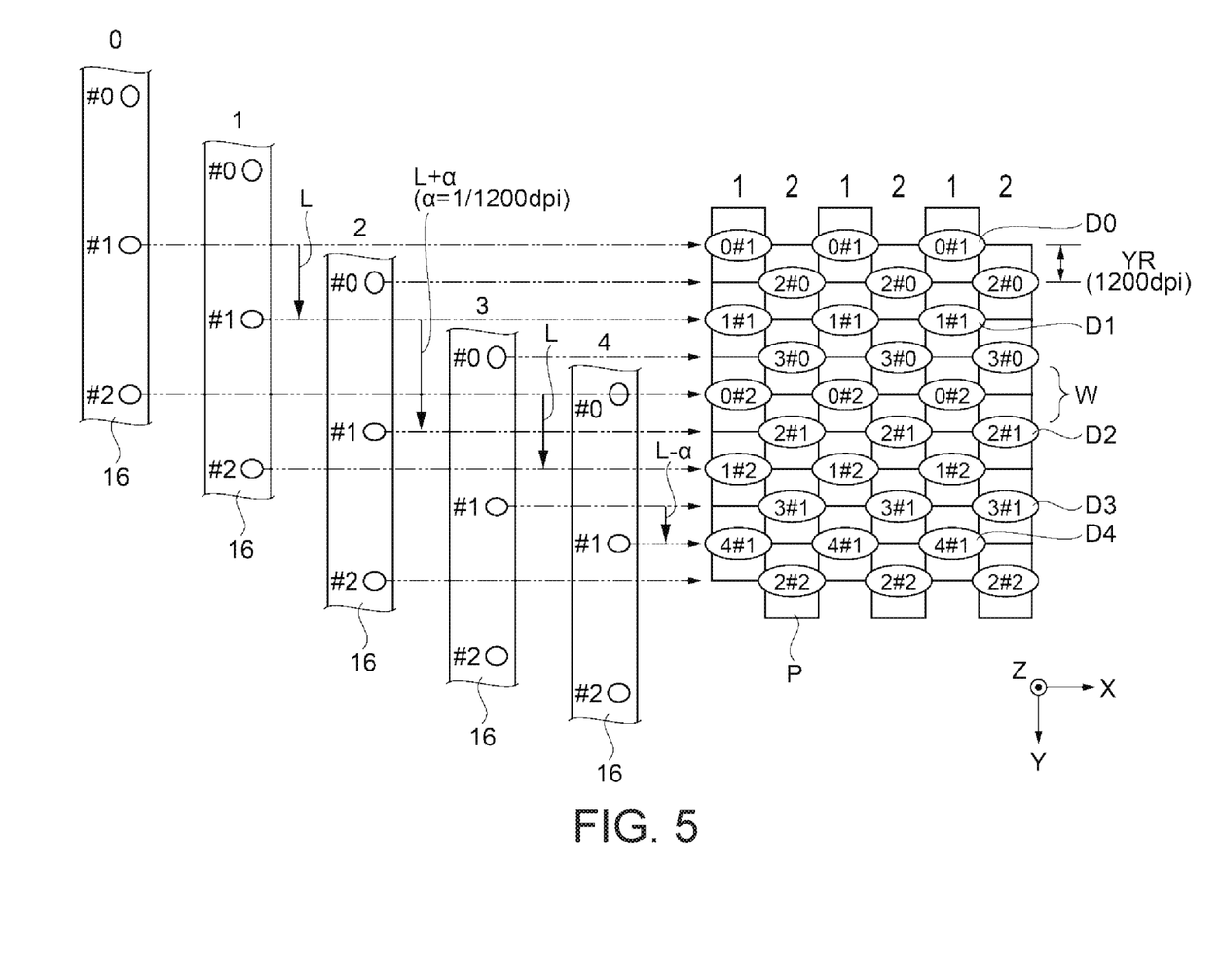
FIG. 5 is a conceptual diagram showing a relationship between nozzles and dots at the time of a second rasterization.

As shown in the example of FIG. 5, the control section 10 can move the paper P rearward using the first scanning section 17 by adding or subtracting the second transporting amount $\alpha$, which is the inverse number of 1200 dpi, which is the resolution, to or from the first transporting amount L. In this case, the control section 10 can set the first resolution YR of the first scanning section 17 as 1200 dpi.

In addition, the control section 10 can cause the nozzle to eject ink each time the head 16 is moved by the second scanning section 18 by a distance, for example, corresponding to the inverse number of 1200 dpi, which is the resolution.

As a result, the control section 10 can set the second resolution XR, which is the resolution in the left-right direction, to 1200 dpi. FIG. 3 shows an example in which the control section 10 causes the nozzles to eject ink while moving the head 16 to the right at a timing of a spacing that is the inverse number of the resolution 1200 dpi.

After the paper P is moved by the first scanning section 17 by the first transporting amount L based on the first resolution YR, the control section 10 causes the head 16 to eject ink toward the stopped paper P at a timing based on the second resolution XR while the head 16 is moved by the second scanning section 18. The control section 10 repeats this cycle to perform printing on the paper P.

Meanwhile, during printing, a movement of the head 16 in the left-right direction by the second scanning section 18 is referred to as a so-called pass. The left side of FIG. 3 shows positions of the head 16 with respect to the paper P in pass No. 0 to pass No. 4. The number of the pass is shown at the upper end of each pass of the head 16.

The right side of FIG. 3 shows dots that are formed on the paper P by each nozzle of the head 16 in pass No. 0 to the pass No. 4. Characters in each dot indicate pass number and nozzle number at the time of dot formation by the head 16. For example, "1 #2" in the dot indicates a dot formed by the head 16 using the nozzle #2 in the first pass, that is in pass No. 1.

Here, focusing on the nozzle #1 of the head 16, dots D0, D1, D2, D3, and D4 are formed on the paper P in the order of the passes No. 0, 1, 2, 3, and 4.

Hereinafter, these dots formed on the paper P are simply referred to as D0, D1, D2, D3, and D4. Further, the movement of the paper P by the first scanning section 17 by the first transporting amount L is simply referred to as L. The relationship between the order in which the dots D0, D1, D2, D3, and D4 are formed and the movement of the paper P by the first scanning section 17 is D0, L, D1, L, D2, L, D3, L, D4, L in accordance with the order of the passes. The control section 10 performs the processing in this order.

As will be described later, the number of the pixel column is indicated at the upper end of the pixel column of each dot. In order to compare with FIG. 5, also in FIG. 3 the pixel columns are divided by two rows and shown as the column No. 1 and the column No. 2.

Sets of pixel data stored in the storage section 15 are arranged corresponding to the respective dots shown in FIG. 3. These are related to the processing of the first rasterization (S104) shown in FIG. 4, which is the processing in which the rasterization section 13 of the control section 10 rearranges pixel data, as will be described later.

As described above, the dot shape when the ink lands on the paper P tends to be laterally elongated, which is longer in the left-right direction than in the front-rear direction, as shown in FIG. 3. Such a dot is referred to as a laterally elongated dot.

As a result, in the example of FIG. 3, a continuous stripe-like gap along the left-right direction is likely to occur within a single inter dot W in the front-rear direction. Hereinafter, a single inter dot W in the front-rear direction is simply referred to as an inter dot W. For this reason, filling in between dots becomes poor, and the tint may be weak. Further, a so-called white streak may occur due to an error when the paper P is moved by the first scanning section 17, but a stipe-shaped gap in the inter dot W may become conspicuous due to the white streak.

A gap that appears in a striped pattern on the paper P due to an error caused by the first scanning section 17 is also referred to as so-called banding.

1-2. Method for Controlling Printing Device

A method of controlling the printing device 1 will now be described with reference to FIG. 4 and, in part, also to FIG. 5.

First, a flow in which the control section 10 processes image data will be described. The communication section 19 of the printing device 1 receives image data, which is input data, from the external device side communication section 23 of the external device 2. The control section 10 acquires image data via the communication section 19 (S101).

The image data is composed of, for example, bitmap data expressed in Red, Green, and Blue (RGB) color spaces. More specifically, the bit map data is expressed by 256 gradation values of 0 to 255 represented by 8 bits which are the respective density gradation values of RGB.

In accordance with a color conversion table stored in the storage section 15, the color conversion section 11 of the control section 10 performs color conversion on the bitmap data into the data of the ink ejection amount expressed in a color space of four colors, for example, CMYK, which are ink colors corresponding to the head 16 (S102).

For example, the data of the ink ejection amount is expressed by a value expressed by 256 gradations from 0 to 255 indicated by 8 bits which are density gradation values of CMYK. The data of the ink ejection amount is represented by, for example, each density gradation value of CMYK, and corresponds to each nozzle of each nozzle array for each ink color.

The color conversion table is a lookup table (LUT) stored in the storage section 15, and is a table in which each data set of ink ejection amount of CMYK corresponding to each density gradation value of RGB of the bitmap data is stored.

The color conversion table is set in accordance with printing conditions such as the type of paper P and the resolution of the head 16. The color conversion section 11 can convert image data into the data of the ink ejection amount according to the type of paper P and the resolution of the head 16.

Next, the halftone processing section 12 of the control section 10 performs halftone processing for converting the data of the ink ejection amount converted from the image data by the color conversion section 11 into data of the number of gradations which can be formed by the head 16 of the printing device 1 (S103).

The halftone processing section 12 can convert, for example, the data of the ink ejection amount expressed in 256 gradations into 2-bit data of four gradations including "no dot", "small dot", "medium dot", and "large dot", which is data capable of forming dots of each size. As the data of the ink ejection amount becomes larger, it is converted into dots of larger size. The data, corresponding to "no dot", "small dot", "medium dot", and "large dot", is referred to as dot data.

For example, when the value of the data of the ink ejection amount is small, then the halftone processing section 12 generates dot data including "small dot" and can produce a print result with a low density. On the other hand, when the value of the data of the ink ejection amount is large, the halftone processing section 12 generates dot data including "large dot" and can obtain a printing result with high density.

In the storage section 15, dot occurrence rates at which dot data indicating "no dot", "small dot", "medium dot", and "large dot" is generated for the data of the ink ejection amount is stored as a dot occurrence rate table.

The halftone processing section 12 refers to the dot occurrence rate table of the storage section 15 and generates dot data corresponding to the data of the ink ejection amount.

Further, the halftone processing section 12 creates dot data so that each dot is formed in a dispersed manner by using dithering, error diffusion, or the like with respect to the dot data obtained by the dot occurrence rate table.

The dot data can also be converted so as to correspond to, for example, the amount of ink ejected from the nozzles. Further, the data of the ink ejection amount can also be converted in correspondence with the number of times ink is ejected from the nozzles, for example.

The dot data subjected to these processes is temporarily stored in the storage section 15 arranged in a matrix.

Next, the rasterization section 13 of the control section 10 performs a first rasterizing process in which the dot data arranged in a matrix and stored in the storage section 15 is allocated and rearranged in an order in which dots can be formed by ejecting ink from nozzles while moving the head 16 by the second scanning section 18 after moving the paper P by the first scanning section 17 (S104).

Based on the dot data generated by the halftone processing section 12, the rasterization section 13 generates pixel data with which a dot can be formed by driving the nozzles of the head 16. The pixel data is arranged by the rasterization section 13 so that dots can be formed by the nozzles of the head 16, and then stored in the storage section 15.

The pixel data may be the same as the dot data or the same as the data of the ink ejection amount.

The control section 10 can sequentially read the pixel data from the storage section 15 and form a raster line composed of dots corresponding to each pass.

FIGS. 3 and 5 show an example in which the rasterization section 13 performs a first rasterization process for one color as pixel data corresponding to the "small dot", and dots are formed by the nozzles of the nozzle row corresponding to the one color ink color of the head 16.

As described above, in the example of FIG. 3, a stripe-shaped gap that is continuous in the left-right direction is likely to be generated in the inter dot W.

Therefore, the rasterization section 13 performs a second rasterization process of dividing the pixel data stored in the storage section 15 into a plurality of columns and determining an offset target column and an offset amount (S105).

The second rasterization processed by the rasterization section 13 of the control section 10 will be described below with reference to FIG. 5 in comparison with FIG. 3.

Note that FIG. 5 is configured similarly to the case of FIG. 3. That is, on the left side of FIG. 5, the positions of the head 16 at the time of the pass No. 0 to the pass No. 4 after the paper P is moved by the first scanning section 17 are illustrated. The nozzle row of the head 16 corresponds to one ink color. The order number of the pass is shown at the position of the upper end of each head 16.

On the right side of FIG. 5, dots that are formed on the paper P by each nozzle of the head 16 from the passes No. 0 to No. 4 are shown. The characters inside the dots indicate which number nozzle formed the dot in which pass. The upper end of the dot indicates the number of the pixel column, which is shown here as the column No. 1 and the column No. 2.

Each pixel data stored in the storage section 15 corresponds to each dot shown in FIG. 5. Further, the sets of pixel data stored in the storage section 15 are arranged at addresses in an order corresponding to the dots shown in FIG. 5.

The control section 10 causes the nozzles of the head 16 to form laterally elongated dots that are longer in the left-right direction than in the front-rear direction on the paper P, based on a plurality of pixel data groups using pixel columns having a plurality of pixel data sets in the front-rear direction as the column No. 1 and the column No. 2 in the left-right direction.

In the example of FIG. 5, as indicated by the dots on the right side, the rasterization section 13 divides the pixel data into units of two pixel columns as a plurality of columns. In other words, the rasterization section 13 divides the pixel data sets into pixel data groups of two columns as a plurality of columns.

The control section 10 prints the pixel data groups composed of two columns with the resolution in the front-rear direction as 600 dpi, which is the first resolution, the resolution in the left-right direction as 1200 dpi, which is the second resolution, and the first resolution as the resolution that is smaller than the second resolution.

When the first resolution is smaller than the second resolution, that is, in a case where, the first resolution is 600 dpi and the second resolution is 1200 dpi as shown in FIG. 3, then poor dot filling in the inter dot W is more likely to be conspicuous.

With respect to the two pixel columns, the rasterization section 13 determines the column No. 2 of the even-numbered columns, which are a part of the pixel columns, as an offset target column. Then, the rasterization section 13 determines, as an offset amount, a second transporting amount α which is a distance that is an inverse number of the 1200 dpi resolution.

As described above, when printing is executed based on pixel data groups including two pixel columns, the rasterization section 13 relatively offsets the column No. 2, which is at least a part of the pixel columns, relative to the other column No. 1 in the front-rear direction by the second transporting amount α, which is the inverse number of resolution 1200 dpi, which is less than the inverse number of resolution 600 dpi.

In this way, the rasterization section 13 can set the second transporting amount α to a value obtained by multiplying the inverse number of 600 dpi, which is the first resolution, by the inverse number of 2, which is the number of pixel columns. That is, the rasterization section 13 can set the second transporting amount α to a value obtained by multiplying the inverse number of the first resolution by the inverse number of the number of pixel columns.

The rasterization section 13 can cause the first scanning section 17 to offset relatively by a second transporting amount α as a predetermined distance with an odd-numbered pixel column as the column No. 1 and an even-numbered pixel column as the column No. 2, which are adjacent to each other.

FIG. 3 corresponding to the result of the first rasterization process performed by the rasterization section 13 shows a state before the offset related to the second rasterization process is performed. The control section 10 causes the first scanning section 17 to uniformly move the paper P by the first transporting amount L before every pass in which the second scanning section 18 moves the head 16. Therefore, the rasterization section 13 moves both the column No. 1 and the column No. 2 by the first transporting amount L in the front-rear direction, and does not perform offset.

As described above, when attention is paid to the nozzle #1 of the head 16, the control section 10 performs processing in the order of D0, L, D1, L, D2, L, D3, L, D4, L in the order of the 0th to 4th passes.

On the other hand, FIG. 5 shows the state after performing the offset related to the second rasterization processing by the rasterization section 13. The rasterization section 13 performs the second rasterizing process, and in the column No. 1, the first scanning section 17 moves the paper P by the first transporting amount L as in the case of FIG. 3, and in the column No. 2, the transport amount is obtained by adding or subtracting the second transporting amount α to or from the first transporting amount L. That is, the control section 10 relatively offsets the even-numbered columns with respect to the odd-numbered columns by the second transporting amount α among two pixel columns.

Focusing on the nozzle #1 of the head 16, when the transport by the second transporting amount α by the first scanning section 17 is simply α, the control section 10 performs processing in the order of D0, (L), D1, (L+α), D2, (L), D3, (L−α), D4 in the order of the 0th to 4th passes.

In this way, the rasterization section 13 repeats any combination of offsetting at least a part of the pixel columns with respect to the other pixel columns by the second transporting amount α, a long offset such as (L+α), a short offset shortened by the second transporting amount α such as (L−α), and a non-offset such as (L).

FIG. 5 shows a case where the rasterization section 13 has two pixel columns of the pixel data groups, but the same applies to a case where the pixel data groups have three or more pixel columns.

The rasterization section 13 sets the second transporting amount α to a value obtained by multiplying the inverse number of the first resolution by the inverse number of the number of pixel columns, and repeats any combination of a long offset, a short offset, and a non-offset of at least one pixel column with respect to another pixel column by the second transporting amount α.

As a result, as shown in FIG. 5, the positions of the dots in the columns No. 1 and No. 2 are arranged like a so-called checker flag pattern. That is, since the positions of the dots in the column No. 1 and the column No. 2 are alternately formed in the front-rear direction, a stripe-shaped gap that is continuous in the left-right direction is less likely to occur in the inter dot W. The positions of the dots in the columns No. 1 and No. 2 are alternately displaced in the left-right direction as well, and a gap is unlikely to be created in the front-rear direction as well.

In addition, even in a case where a white streak occurs due to margin of error when the paper P is moved by the first scanning section 17, it is possible to prevent the stipe-shaped gaps in the inter dot W from being conspicuous.

Next, control by the control section 10 to form dots on the paper P will be specifically described. Hereinafter, for convenience of description, attention is focused on the nozzle #1 of the head 16, and the dots D0, D1, D2, D3, and D4 formed on the paper P will be described. It is assumed that these symbols of dots also correspond to the pixel data stored in the storage section 15.

The control section 10 sequentially acquires pixel data of a pixel column to be processed from the storage section 15 (S106).

The control section 10 determines whether or not condition that the previous processing target is a non-target column and the current processing target is a target column is satisfied (S107).

First, the current processing target is set to the column No. 1 of the pixel column including D0 of the pixel data. It is assumed that the previous processing target was a non-target column. The control section 10 determines that the current processing target is the pixel column of column No. 1, which is a non-target column, so determines that the current processing target is not a target column (S107: NO).

Then, it is determined whether or not the previous processing target was the target column and also the current processing target is a non-target column (S108). The control section 10 determines that the previous processing target was not the target column because the previous processing target was a non-target column (S108: NO).

The control section 10 sets the transportation amount PF by the first scanning section 17 as the first transporting amount L, and sets PF=L (S109). The control section 10 causes the first scanning section 17 to move the paper P rearward by the first transporting amount L, which is the transportation amount PF (S110).

Then, as the zeroth pass, the control section 10 causes the second scanning section 18 to move the head 16 to the right and causes the nozzle #1 to eject ink based on the pixel data including the D0 of the column No. 1 at a timing when the head 16 is at the position of the column No. 1, so as to form a D0 dot on the paper P and perform printing (S111).

Next, the current processing target is set to the column No. 1 of the pixel column including D1 pixel data. In the case of the previous pixel data D0, the processing target was the non-target column of the column No. 1. The control section 10 determines that the current processing target is the non-target column No. 1 and is not the target column (S107: NO).

The control section 10 sets the transportation amount PF to the first transporting amount L, and sets PF=L (S109). The control section 10 causes the first scanning section 17 to move the paper P rearward by the first transporting amount L, which is the transportation amount PF (S110).

Then, as the first pass, the control section 10 causes the nozzle #1 to eject ink based on the pixel data including the D1 of the column No. 1 at a timing when the head 16 is at the position of the column No. 1, while causing the second scanning section 18 to move the head 16 to the right, so as to form a dot D1 on the paper P and perform printing (S111).

Next, the current processing target is set to the column No. 2 of pixel column including D2 of the pixel data. In the case of the previous pixel data D1, the processing target was the non-target column No. 1. The control section 10 determines that the previous processing target was a non-target column and that the current processing target is the target column No. 2 (S107: YES).

The control section 10 offsets the transportation amount PF by adding the second transporting amount α to the first transporting amount L, and sets PF=L+α (S113). The control section 10 causes the first scanning section 17 to move the paper P rearward by a transportation amount PF obtained by adding the second transporting amount α to the first transporting amount L (S110).

Then, in the second pass, while moving the head 16 to the right by the second scanning section 18, the control section 10 ejects ink from the nozzle #1 based on the pixel data including D2 in the column No. 2 at the timing when the head 16 is set in the position of the column No. 2, thereby forming and printing a dot D2 on the paper P (S111).

Next, the current processing target is set to the column No. 2 of pixel column including D3 pixel data. In the case of the previous pixel data D2, the processing target was also the target column of the column No. 2. The control section 10 determines that the previous processing target was the target column and not the non-target column (S107: NO).

Then, the control section 10 determines that the current processing target is the target column and not the non-target column (S108: NO).

The control section 10 sets the transportation amount PF to the first transporting amount L, and sets PF=L (S109). The control section 10 causes the first scanning section 17 to move the paper P rearward by the first transporting amount L, which is the transportation amount PF (S110).

Then, in the third pass, while moving the head 16 to the right by the second scanning section 18, the control section 10 ejects ink from the nozzle #1 based on the pixel data including D3 in the column No. 2 at the timing when the head 16 is set in the position of the column No. 2, thereby forming and printing dots D3 on the paper P (S111).

Next, the current processing target is set to the column No. 1 of the pixel column including the pixel data D4. In the case of the previous pixel data D3, the processing target was the target column of the column No. 2. The control section 10 determines that the previous processing target was the target column and not the non-target column, and that the current processing target is the non-target column of the column No. 1 and not the target column (S107: NO).

Then, the control section 10 determines that the previous processing target was the target column and the current processing target is the non-target column (S108: YES).

The control section 10 offsets the transportation amount PF by subtracting the second transporting amount $\alpha$ from the first transporting amount L, and sets PF=L−$\alpha$ (S114). The control section 10 causes the first scanning section 17 to move the paper P rearward by a transportation amount PF obtained by subtracting the second transporting amount $\alpha$ from the first transporting amount L (S110).

Then, in the fourth pass, while moving the head 16 to the right by the second scanning section 18, the control section 10 ejects ink from the nozzle #1 based on the pixel data including D4 in the column No. 1 at the timing when the head 16 is set in the position of the column No. 1, thereby forming and printing dots D4 on the paper P (S111).

The control section 10 determines whether or not the processing has been completed for all of the pixel columns to be processed stored in the storage section 15 (S112). When the control section 10 determines that the process has not been finished for all the pixel columns of the process target (S112: NO), the control section 10 acquires pixel data of a pixel column of a next process target from the storage section 15 and repeats the process described above (S112: NO). When the control section 10 determines that the process has been finished for all the pixel columns to be processed (S112: YES), the control section 10 finishes the process.

Although the above description focused on the nozzle #1 of the head 16, the control section 10 performs the same processing for other nozzles.

As a result, as shown in FIG. 5, the positions of the dots in the columns No. 1 and No. 2 formed on the paper are repeatedly arranged like a checker flag pattern, and a stripe-like gap that is continuous in the left-right direction is less likely to occur between the inter dot W.

As described above, a series of offset operations in which the control section 10 sets pixel data as a pixel data group divided into a plurality of pixel columns, calculates the second transporting amount $\alpha$, and performs a combination of offsetting at least some of adjacent pixel columns with respect to other pixel columns by the second transporting amount $\alpha$, offsetting them longer, offsetting them shorter, and not offsetting them may take time to process.

Therefore, in the dots formed on the paper P, in a case of a condition in which filling between the dots is not bad and there is a tendency that the tint tends not to be weak, it is sometimes preferable that the control section 10 does not perform the offset operation.

When the first resolution is smaller than the second resolution, that is, in a case where, the first resolution is 600 dpi and the second resolution is 1200 dpi as shown in FIG. 3, the poor filling is more conspicuous while filling an image with laterally elongated dots. On the other hand, in a case where the first resolution is greater than or equal to the second resolution, poor filling is less likely to be conspicuous.

Therefore, when printing is performed based on the pixel data group in which the first resolution is equal to or greater than the second resolution, the control section 10 causes the first scanning section 17 to not relatively offset the adjacent pixel columns by a predetermined distance.

When the first resolution is equal to or greater than the second resolution, since the shape of the pixels, which are in the form of a grid, and the shape of the laterally elongated dots as shown in the right side of FIG. 5 and FIG. 3 are close to each other, the filling between the dots hardly deteriorates, as compared to the case where the first resolution is less than the second resolution. When the first resolution is equal to or greater than the second resolution, the control section 10 can shorten the processing time by performing printing without performing the offset operation.

As described above, the halftone processing section 12 of the control section 10 generates dot data such as a "small dot", a "medium dot", and a "large dot". The control section 10 can generate pixel data based on the dot data, eject ink from nozzles of the head 16 onto the paper P, and form dots of different sizes.

The "small dots", which are the smallest dots, are often sparsely arranged in order to mainly express halftones, and the poor filling of dots is less likely to be a problem. On the other hand, the "large dots", which are the largest dots, are often used to express a high-gradation image such as a solid image. As shown in FIG. 3, when an image is filled by arranging dots in all pixels, if printing is performed in the condition that the first resolution is less than the second resolution, poor filling tends to be conspicuous. In addition, in the case of the "medium dots" or the like, poor filling is conspicuous as compared with the case of small dots.

Therefore, when printing is performed by mainly forming "small dots" which are the smallest dots, the control section 10 causes the first scanning section 17 not to relatively offset the adjacent pixel columns by a predetermined distance.

On the other hand, in a case where poor filling is likely to be conspicuous when printing is performed by mainly using "medium dots" and "large dots", the control section 10 performs printing by performing the offset operation, and thus it is possible to reduce the processing time.

A specific example of "mainly used ... performs printing" is, for example, when the usage ratio of large dots is higher than the usage ratio of small dots when comparing the usage ratios of small dots and large dots. When printing is performed at such usage ratios, since poor filling is easily noticeable, adjacent pixel columns are relatively offset by a predetermined distance by the first scanning section 17.

In addition, even when printing is executed using the large dot size, if the use ratio of the large dot size is smaller than the use ratio of the small dot size, poor filling of dots is unlikely to be a problem, so that printing is executed without performing offset processing.

In the above description, the comparison of the usage ratio between the large dot and the small dot is exemplified, but the absolute size of the dot may be used as the threshold value instead of the relative size of the dot. For example, when the first resolution is 600 dpi and the second resolution is 1200 dpi, if the use ratio of dots heavier (larger) than or equal to 4 ng, is smaller than the use ratio of dots lighter (smaller) than 4 ng, adjacent pixel columns do not have to be relatively offset by predetermined distances by the first scanning section 17.

In a case where the paper P is a medium in which the ink easily bleeds, the dots may bleed and spread to some extent even after the ink lands. As a result, filling between dots may be improved. Therefore, the printing device 1 includes an operation panel (not illustrated) that is a medium designation section capable of designating the type of medium, and when a medium that is more likely to bleed than a predetermined threshold is designated via the operation panel, the control section 10 causes the first scanning section 17 to not relatively offset adjacent pixel columns by a predetermined distance.

The predetermined threshold value can be set as the type of medium, and can be, for example, photo glossy paper. When the photo glossy paper is designated by the operation panel, the control section 10 can reduce the processing time by performing printing without performing the offset operation.

The external device 2 may transmit a command to specify the type of medium to the printing device 1.

When the moving speed of the head 16 by the second scanning section 18 becomes fast, an satellites of ink droplets ejected from a nozzle may spread and land to the left and right of a main droplet and dots tend to become elongated in the left-right direction. On the other hand, when the moving speed of the head 16 becomes slow, the satellite of the ink droplet may land on the paper P so as to overlap with the main droplet, and the dot is less likely to become long in the left-right direction.

Therefore, when the speed of the second scanning in which the second scanning section 18 is moved in the left-right direction is faster than a predetermined speed threshold, the control section 10 causes the first scanning section 17 to relatively offset the adjacent pixel columns by a predetermined distance, and when the speed of the second scanning is equal to or less than the predetermined speed threshold, the control section 10 does not offset the adjacent pixel columns.

When the moving speed of the head 16 by the second scanning section 18 becomes slow, the dot is less likely to become elongated in the left-right direction. Therefore, even when the control section 10 performs the offset operation, the effect of improving the filling between dots is low. In this case, the control section 10 gives priority to increasing the moving speed of the head 16 and increasing the printing speed.

At least a part of the functions processed by the control section 10 of the printing device 1 described above with reference to FIG. 4 may be performed by the external device 2. Specifically, the external device side control section 20 reads the driver 21 stored in the external device side storage section 22 and executes the driver 21.

Figure 4:
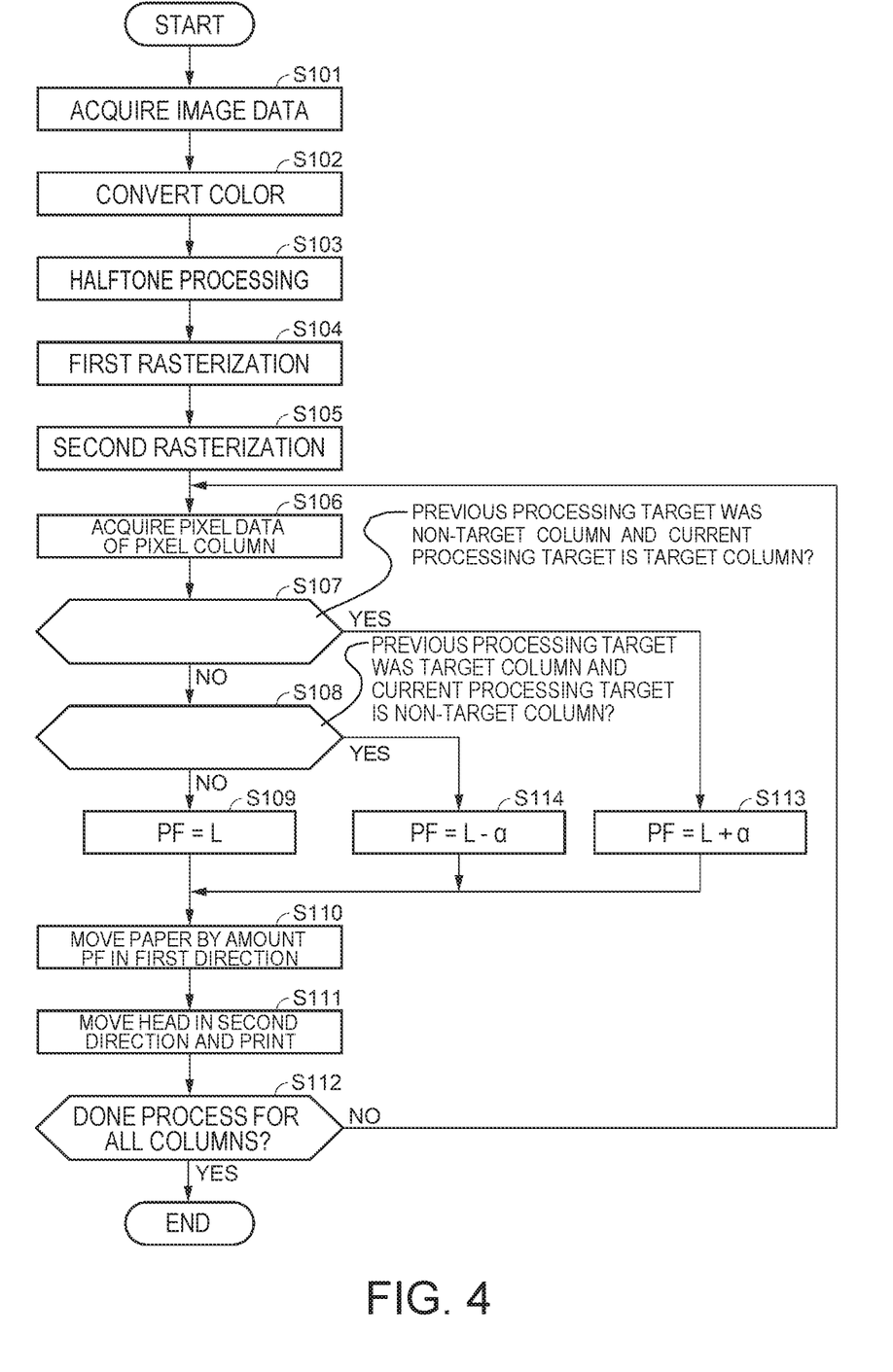
FIG. 4 is a flowchart showing a printing process.

The external device side control section 20 executes an application and generates image data, and then the driver 21 executes the next process shown in FIG. 4.

That is, the external device side control section 20 executes color conversion (S102), executes halftone processing (S103), executes processing of first rasterization (S104), and executes processing of second rasterization (S105) in which pixel data divided into a plurality of columns and determines an offset target column and an offset amount.

Then, the external device side control section 20 executes processes of (S107) to (S109), (S113), and (S114) shown in FIG. 4.

For example, the external device side control section 20 generates a command including pixel data arranged in the order of the passes No. 0, 1, 2, 3, and 4 and data of an amount by which the paper P is transported by the first scanning section 17 between the passes, and transmits the command from the external device side communication section 23 to the printing device 1.

Specifically, the external device side control section 20 generates a command for causing the printing device 1 to perform processing in the order of D0, (L), D1, (L+α), D2, (L), D3, (L−α), D4 in the order of "0" to "4" passes, and transmits the command to the printing device 1. The external device side control section 20 performs these operations for all pixel columns (S112).

Based on the command received from the external device 2, the control section 10 of the printing device 1 may move the paper P by the transportation amount PF by the first scanning section 17 (S110) and may move the head 16 by the second scanning section 18 to print by the head 16 (S111), as illustrated in FIG. 4.

As a result, similarly to the case of the printing device 1 described above, the external device side control section 20 of the external device 2 can cause the driver 21 to relatively offset the adjacent pixel columns by a predetermined distance by the first scanning section 17. As shown in FIG. 5, the positions of the dots in each column No. 1 and the column No. 2 are arranged like a checker flag pattern, and a stripe-like gap that is continuous in the left-right direction is less likely to occur in the inter dot W.

In this way, the external device side control section 20 of the external device 2 executes at least a part of the functions processed by the control section 10 of the printing device 1 by the driver 21, and the same result can be obtained.

In addition, when the external device side control section 20 of the external device 2 determines by the driver 21 that the conditions are such that filling between the dots formed on the paper P are not bad and that the tendency is that tint will not become weak, the external device side control section 20 can also transmit a command for not performing the offset operation to the printing device 1.

For example, when it is determined by the setting of the driver 21 or the processing of the driver 21 that the first resolution is equal to or greater than the second resolution, "small dots" are not formed, the type of the medium has equal to or greater than a threshold value that blurred-dot will easily occur, the speed of the second scanning section 18 is equal to or less than a threshold value, or the like, then the external device side control section 20 sets the command to not offset the adjacent pixel columns.

As described above, the control section 10 causes the head 16 to form dots on the paper P and print based on a pixel data group having a plurality of pixel columns, such as two columns in the left-right direction, which have a plurality of pixel data sets in the front-rear direction. The ink that landed on the paper P is likely to become a dot having a shape that is longer in the left-right direction than in the front-rear direction and to form a laterally elongated dot.

When the first resolution is smaller than the second resolution, that is, in a case where, the first resolution is 600 dpi and the second resolution is 1200 dpi, poor dot filling becomes more remarkable in the inter dot W of laterally elongated dots.

When printing is performed, the control section 10 relatively offsets the column No. 2, which is at least a part of the pixel columns, with respect to the other column No. 1 of the pixel columns in the front-rear direction by the second transporting amount α. The second transporting amount α is the inverse number of 1200 dpi, which is the second resolution, and the second transporting amount α is less than the inverse number of 600 dpi, which is the first resolution.

As a result, the dots in each column No. 1 and No. 2 formed on the paper are repeatedly arranged like a checker flag pattern, and a stripe-like gap that is continuous in the left-right direction is less likely to occur in the inter dot W.

As described above, each embodiment has been described in detail with reference to the drawings, but the specific configuration is not limited to these embodiments, and changes, substitutions, deletions, and the like may be made without departing from the gist of the present invention.

In addition, a program such as firmware or a driver for realizing a function of an arbitrary configuration in the device described above may be recorded in a computer-readable recording medium, and the program may be read and executed by a computer system. Here, the device is, for example, the printing device 1, the external device 2, or the like. Here, the "computer system" includes an Operating System (OS) and hardware such as peripheral devices. The "computer-readable recording medium" includes portable media such as a flexible disk, a magneto-optical disk, a ROM, and a Compact Disk Read Only Memory (CD-ROM), and storage devices such as a hard disk built into a computer system. Furthermore, the "computer-readable recording medium" includes a medium that holds a program for a certain period of time, such as a volatile memory inside a computer system serving as a server or a client when a program is transmitted via a network such as the Internet or a communication line such as a telephone line.

In addition, the program may be transmitted from a computer system in which the program is stored in a storage device or the like to another computer system via a transmission medium or by a transmission wave in the transmission medium. Here, a "transmission medium" for transmitting a program refers to a medium having the function of transmitting information such as a network such as the Internet or a communication line such as a telephone line.

In addition, the above-described program may be a program for realizing a part of the above-described functions. Further, the program may be a so-called difference file or difference program capable of realizing the functions described above in combination with a program already recorded in the computer system.

What is claimed is:

1. A printing device comprising:
a head in which a plurality of nozzles configured to form dots by ejecting liquid onto a medium are arranged in a first direction;
a first scanning section that performs a first scan in which the head and the medium are relatively moved in the first direction;
a second scanning section on which the head is mounted, the second scanning section and the medium moving relatively in a second direction, which intersects the first direction, over multiple passes; and
a control section that causes the head to form the dots that are longer in the second direction than in the first direction, based on a pixel data group having pixel columns in the second direction, the pixel columns having pixel data in the first direction, wherein
assuming that a resolution in the first direction of the pixel data group is defined as a first resolution and a resolution in the second direction is defined as a second resolution,
when printing is executed based on a pixel data group in which the first resolution is smaller than the second resolution, the control section offsets at least a part of the pixel columns from other pixel columns in the first direction by a predetermined distance that is less than an inverse number of the first resolution,
the head forms the dots at corresponding pixel columns during each of the passes,
when the head forms the dots at the same pixel column in first and second passes that are consecutive to each other, the head and the medium are relatively moved in the first direction by a predetermined feed distance after the first pass,
when the head forms the dots at a first pixel column in the first pass before forming the dots at a second pixel column in the second pass, the head and the medium are relatively moved in the first direction by an increased feed distance after the first pass, the increased feed distance being obtained by increasing the predetermined feed distance by the predetermined distance, and
when the head forms the dots at the second pixel column in the first pass before forming the dots at the first pixel column in the second pass, the head and the medium are relatively moved in the first direction by a decreased feed distance after the first pass, the decreased feed distance being obtained by decreasing the predetermined feed distance by the predetermined distance.

2. The printing device according to claim 1, wherein the control section repeats any combination of
offsetting at least a part of the pixel columns to be longer by the predetermined distance than the other pixel columns,
offsetting the at least a part of the pixel columns to be shorter by the predetermined distance, or
not offsetting the at least a part of the pixel columns with respect to the other pixel columns.

3. The printing device according to claim 1, wherein the control section, when printing is executed based on a pixel data group having the first resolution equal to or higher than the second resolution, does not cause the first scanning section to relatively offset the adjacent pixel columns by the predetermined distance.

4. The printing device according to claim 1, wherein the control section causes the first scanning section to relatively offset adjacent odd-numbered pixel columns and even-numbered pixel columns by the predetermined distance.

5. The printing devices, according to claim 1, wherein the control section causes the first scanning section to relatively offset adjacent pixel columns by the predetermined distance that is set to a value obtained by multiplying an inverse number of the first resolution by an inverse number of a number of pixel columns.

6. The printing device according to claim 1, wherein the control section is configured to form the dot in a plurality of different sizes and
to cause the first scanning section to relatively offset adjacent pixel columns by the predetermined distance when printing is executed under a condition that, among the different size dots, a use ratio of dots larger than a predetermined threshold value is higher than a use ratio of dots smaller than the threshold value.

7. The printing device according to claim 1, further comprising:
a medium designation section configured to designate a type of the medium, wherein
when the medium is designated by the medium designation section to be more likely to bleed than a predetermined threshold value, the control section does not cause the first scanning section to relatively offset the adjacent pixel columns by the predetermined distance.

8. A printing device comprising:
a head in which a plurality of nozzles configured to form dots by ejecting liquid onto a medium are arranged in a first direction;
a first scanning section that performs a first scan in which the head and the medium are relatively moved in the first direction;
a second scanning section on which the head is mounted, the second scanning section and the medium moving relatively in a second direction, which intersects the first direction; and
a control section that causes the head to form the dots that are longer in the second direction than in the first direction, based on a pixel data group having pixel columns in the second direction, the pixel columns having pixel data in the first direction, wherein
assuming that a resolution in the first direction of the pixel data group is defined as a first resolution and a resolution in the second direction is defined as a second resolution,
when printing is executed based on a pixel data group in which the first resolution is smaller than the second resolution, the control section offsets at least a part of the pixel columns from other pixel columns in the first direction by a predetermined distance that is less than an inverse number of the first resolution, and
the control section
causes the first scanning section to relatively offset adjacent pixel columns by the predetermined distance, when a speed of a second scan of scanning of the second scanning section in the second direction is higher than a predetermined speed threshold and not to offset adjacent pixel columns, when the speed of the second scanning is equal to or lower than the predetermined speed threshold.

9. A control method of a printing device, the printing device including
a head in which a plurality of nozzles configured to form dots by ejecting liquid onto a medium are arranged in a first direction;
a first scanning section that performs a first scan in which the head and the medium are relatively moved in the first direction; and
a second scanning section that mounts the head and relatively moves in a second direction intersecting with the first direction with respect to the medium over multiple passes,
the control method comprising:
causing the head to form the dots that are longer in the second direction than in the first direction, based on a pixel data group having pixel columns in the second direction, the pixel columns having pixel data in the first direction; and
assuming that a resolution in the first direction of the pixel data group is defined as a first resolution and a resolution in the second direction is defined as a second resolution, when printing is executed based on a pixel data group in which the first resolution is smaller than the second resolution, the control section offsets at least a part of the pixel columns from other pixel columns in the first direction by a predetermined distance that is less than an inverse number of the first resolution, wherein
the head forms the dots at corresponding pixel columns during each of the passes,
when the head forms the dots at the same pixel column in first and second passes that are consecutive to each other, the head and the medium are relatively moved in the first direction by a predetermined feed distance after the first pass,
when the head forms the dots at a first pixel column in the first pass before forming the dots at a second pixel column in the second pass, the head and the medium are relatively moved in the first direction by an increased feed distance after the first pass, the increased feed distance being obtained by increasing the predetermined feed distance by the predetermined distance, and
when the head forms the dots at the second pixel column in the first pass before forming the dots at the first pixel column in the second pass, the head and the medium are relatively moved in the first direction by a decreased feed distance after the first pass, the decreased feed distance being obtained by decreasing the predetermined feed distance by the predetermined distance.

* * * * *